(12) United States Patent
Amaral (10) Patent No.: US 8,531,069 B2
(45) Date of Patent: Sep. 10, 2013

(54) ELECTRIC GENERATOR

(75) Inventor: Daniel Amaral, Campinas-SP (BR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/001,142

(22) PCT Filed: Jun. 25, 2009

(86) PCT No.: PCT/EP2009/057951
§ 371 (c)(1),
(2), (4) Date: May 23, 2011

(87) PCT Pub. No.: WO2009/156463
PCT Pub. Date: Dec. 30, 2009

(65) Prior Publication Data
US 2011/0215659 A1    Sep. 8, 2011

(30) Foreign Application Priority Data
Jun. 25, 2008   (DE) .......................... 10 2008 002 638

(51) Int. Cl.
*H02K 19/36* (2006.01)
*H02K 9/02* (2006.01)
*H02K 11/04* (2006.01)

(52) U.S. Cl.
USPC ......... 310/68 D; 310/58; 310/60 A; 310/68 R (58) Field of Classification Search
USPC ............... 310/68 D, 58, 60 A, 68 R; 165/47; 257/692; 363/45
See application file for complete search history.

(56) References Cited

U.S. PATENT DOCUMENTS

| 4,701,828 A * | 10/1987 | Weiner ........................ 361/692 |
| 6,734,587 B2 * | 5/2004 | Hirsou et al. ............... 310/68 D |
| 2007/0046114 A1 * | 3/2007 | Kondo et al. ............... 310/68 D |
| 2008/0303361 A1 * | 12/2008 | Ito et al. ........................ 310/62 |

FOREIGN PATENT DOCUMENTS

| DE | 2848410 | 5/1980 |
| DE | 19705228 | 8/1998 |
| DE | 10111295 | 9/2002 |
| DE | 69804917 | 12/2002 |
| DE | 10301701 | 7/2003 |
| DE | 112004001176 | 12/2006 |
| DE | 102006016239 | 10/2007 |
| DE | 102007034323 | 1/2009 |
| EP | 0125834 | 11/1984 |
| EP | 125834 A2 * | 11/1984 |

(Continued)

OTHER PUBLICATIONS

International Search Report, WO 2009/156463, Sep. 21, 2009, 4 pages.

*Primary Examiner* — Tran Nguyen
*Assistant Examiner* — Jose Gonzalez Quinones
(74) *Attorney, Agent, or Firm* — Michael Best & Friedrich LLP (57) ABSTRACT

An electric generator, comprising a stator and a rotor, the stator having a stator winding (multiple phase windings), which is electrically connected to a rectifier, the recitifier having positive and negative diodes connected by way of a bridge circuit, the positive diodes being connected to a positive cooling body and the negative diodes being connected to a negative cooling body (plugged in or welded), and the rectifier being covered by a protective cap (47) having cooling air openings, characterized in that the protective cap has at least one opening, which is disposed axially above the negative diode and the negative cooling body.

13 Claims, 8 Drawing Sheets

(56) References Cited

FOREIGN PATENT DOCUMENTS

| | | |
|---|---|---|
| EP | 1246347 | 10/2002 |
| EP | 1394925 | 3/2004 |
| ES | 8503173 | 5/1985 |
| MX | PA03000420 | 8/2005 |
| WO | 02093717 | 11/2002 |

* cited by examiner

ELECTRIC GENERATOR

BACKGROUND

The invention relates to an electric machine, in particular a structure for allowing cooling air flow through the electric machine.

Electric machines include electric components that generate heat as they operate. If the components are not cooled, the component will fail or have a shorter useful life.

SUMMARY

In one embodiment the invention provides an electrical generator. The electrical generator has a stator (16) and a rotor. The stator (16) has a stator winding (18) which is electrically connected to a rectifier (105). The rectifier (105) has positive and negative diodes (88, 58) which are connected by means of a bridge circuit. The positive diodes (88) are connected to a positive heat sink (53) and the negative diodes (58) are connected to a negative heat sink (106). The rectifier is covered by a protective cap (47) which has cooling air openings. At least one opening (103) is arranged axially above the negative diode (58) and the negative heat sink (106).

BRIEF DESCRIPTION OF THE DRAWINGS

FIG. 4b is a plan view of the connecting plate and the screw contract holder of FIG. 4a.

FIG. 4c is a cross-section view of the screw contact holder of FIGS. 4a and 4b.

DETAILED DESCRIPTION

Figure 1:
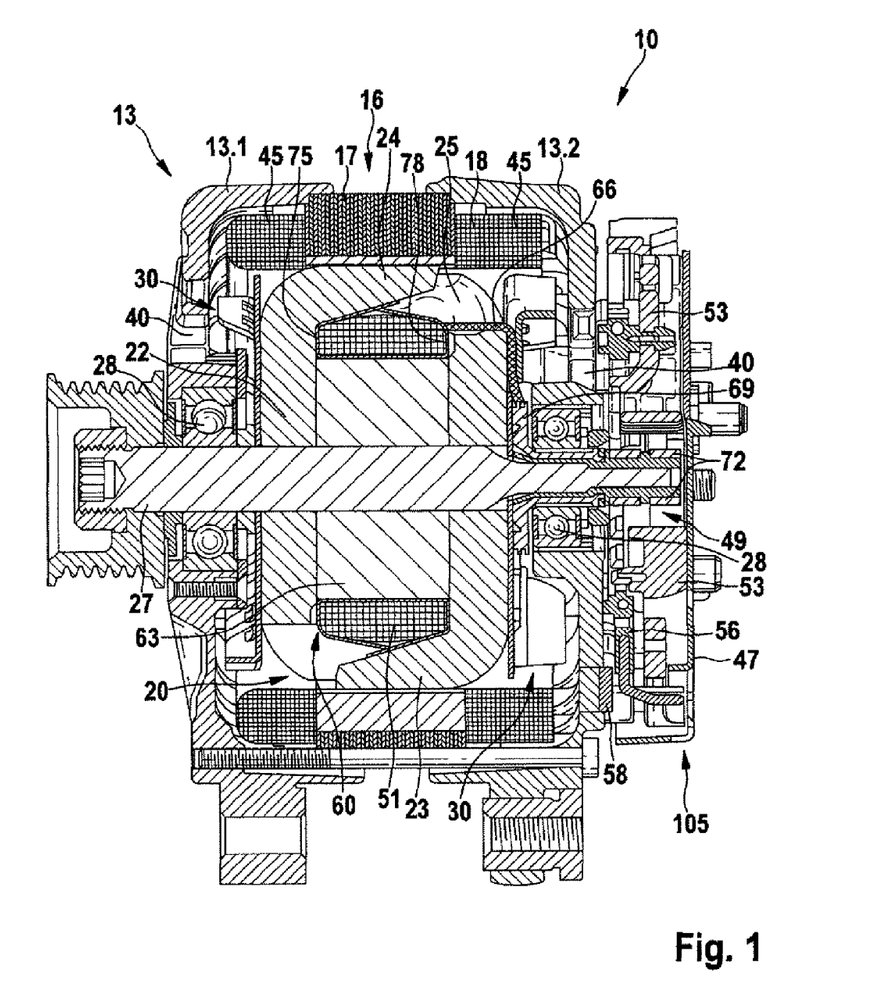
FIG. 1 is a cross-section view of an electric machine.

FIG. 1 shows a cross section through an electrical machine 10, which is illustrated in outline form, and which in this case is in the form of a generator or polyphase generator for motor vehicles. This electrical machine 10 has, inter alia, a two-part housing 13, which consists of a first bearing shield 13.1 and a second bearing shield 13.2. The bearing shield 13.1 and the bearing shield 13.2 hold a so-called stator 16 within them, which on the one hand consists of an essentially annular iron stator core 17, which has slots which are directed radially inward and extend axially, into which a stator winding 18 having a plurality of phase windings is inserted. The slotted surface, which is directed radially inward, of this annular stator 16 surrounds a rotor 20, which is in the form of a claw-pole rotor. The rotor 20 consists, inter alia, of two claw-pole boards 22 and 23, on whose respective outer circumference claw-pole fingers 24 and 25 are arranged, which extend in the axial direction. The two claw-pole boards 22 and 23 are arranged in the rotor 20 such that their claw-pole fingers 24 and 25, which extend in the axial direction, alternate with one another on the circumference of the rotor 20. This results in magnetically required intermediate spaces between the claw-pole fingers 24 and 25, which are magnetized in opposite senses, and these intermediate spaces are referred to as claw-pole intermediate spaces. The rotor 20 is borne such that it can rotate in the respective bearing shields 13.1 and 13.2 by means of a shaft 27 and a respective roller bearing 28, which roller bearings 28 are each located on one side of the rotor.

The rotor 20 has a total of two axial end surfaces, to each of which a fan 30 is attached. This fan 30 essentially consists of a section which is in the form of a plate or disk, from which fan blades originate in a known manner. These fans 30 are used to allow air to be exchanged via openings 40 in the bearing shields 13.1 and 13.2, between the outside of the electrical machine 10 and the interior of the electrical machine 10. For this purpose, the openings 40 are essentially provided at the axial ends of the bearing shields 13.1 and 13.2, via which cooling air is sucked into the interior of the electrical machine 10 by means of the fans 30. This cooling air is accelerated radially outward by the rotation of the fans 30, such that it can pass through the winding overhang 45, through which cooling air can pass. The winding overhang 45 is cooled by this effect. After passing through the winding overhang 45, or after flowing around this winding overhang 45, the cooling air takes a radially outward path, through openings which are not illustrated in this FIG. 1 here.

A protective cap 47 is located on the right-hand side in FIG. 1, and protects various components against environmental influences. This protective cap 47 therefore, for example, covers a so-called slipring assembly 49 which is used to supply the field current to a field winding 51. A heat sink 53 is arranged around this slipring assembly 49, and in this case acts as a positive heat sink. The bearing shield 13.2 acts as a so-called negative heat sink. A connecting plate 56 is arranged between the bearing shield 13.2 and the heat sink 53 and is used to connect negative diodes 58, which are arranged in the bearing shield 13.2 and positive diodes, which are not shown in this illustration here, to one another in the heat sink 53, thus representing a bridge circuit, which is known per se.

Figure 2:
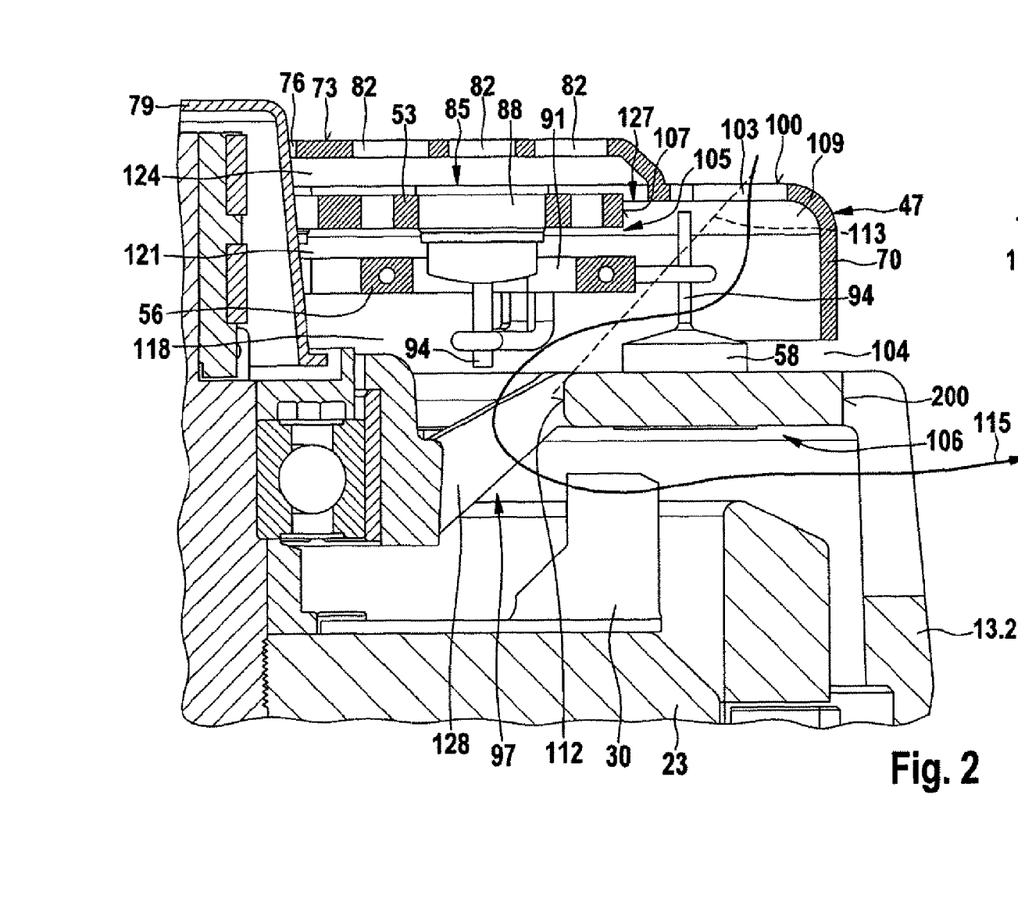
FIG. 2 is a cross-section view of a portion of the electric machine of FIG. 1.

FIG. 2: The protective cap 47 has a cylindrical outer edge 70 which is directed toward the bearing shield 13.2. The protective cap 47 furthermore has a central plateau 73, in whose center an opening 76 is located. A slipring protection means 79 projects through this opening. The protective cap 47 has a plurality of ventilation openings 82, which are arranged in an annular shape, in its plateau 73. The positive heat sink 53 is located directly opposite these ventilation openings 82 in the interior of the electrical machine 10. A plurality of positive diodes 85, whose diode caps 88 are inserted into cylindrical openings in the heat sink 53, are inserted in this heat sink 53. The end of the positive diode 85 which faces the connecting plate 56 projects into an opening 91 in the connecting plate 56.

A diode connecting wire 94 is directed at an annular area 97 of the bearing shield 13.2, in which a plurality of openings 97 are arranged for ventilation of the machine 10.

The protective cap 47 has a recessed annular area 100 between the cylindrical outer edge 70 and the plateau 73, which extends over at least a part of the circumference, in particular over the angle range starting from a rotation axis of the rotor 20, above which the positive diodes 85 are arranged. A plurality of openings 103 are arranged in this annular area 100, over its length, and allow cooling air to enter. Openings which are likewise not illustrated in FIG. 2 but into which the negative diodes 58 are inserted are provided in the negative heat sink 106, which in this case is part of the bearing shield 13.2.

There is an axial distance 104 between the essentially cylindrical outer edge 70 and the negative heat sink 106.

An electrical machine, preferably an electrical generator, having a stator and a rotor is therefore shown, wherein the stator has a stator winding (a plurality of phase windings) which is electrically connected to a rectifier 105, wherein the rectifier has positive and negative diodes which are connected by means of a bridge circuit, wherein the positive diodes are connected to a positive heat sink and the negative diodes are connected to a negative heat sink (plugged in or alternatively soldered on a heat sink which is then not perforated there), and the rectifier is covered by a protective cap 47 which has cooling air openings, wherein the protective cap 47 has at least one opening which is arranged axially above the negative diode and the negative heat sink. The positive heat sink 53 is therefore arranged axially above an air inlet opening 97 in the bearing shield 13.2.

Figure 2A:
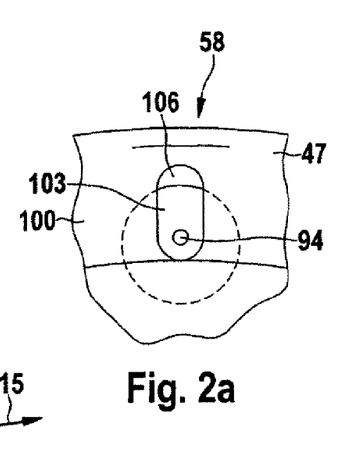
FIG. 2a is a top view of a portion of the electric machine of FIG. 1.

The invention provides for the opening 103 to extend at least such that, in the axial direction, at least one area section of a diode surface with a length of more than half the diameter of a negative diode 58 is exposed without any interruption, and is covered by the opening 103, see also FIG. 2a.

A cavity 109 is arranged between the protective cap 47 and the negative heat sink, wherein the opening 103 which is arranged axially above the negative diode 58, the negative diode 58 and the diode connecting wire 94 thereof itself, and a radial inner edge 112 of the negative heat sink 106 are arranged on one plane 113. This leads to a cooling air flow 115 without any circuitous routes, and with few losses. An opening 82 in the protective cap 47 axially opposite the positive diode 88 is at a greater axial distance from the negative heat sink 106 than the opening 103 in the protective cap axially directly opposite the positive diode 58.

After an intermediate space 118, a connecting plate 56 for provision of the rectifier bridge circuit is first of all arranged between the protective cap 47 and the negative heat sink 106. This is followed by the positive heat sink 53, after a further intermediate space 121. There is a third intermediate space 124 between the final protective cap 47 and the positive heat sink 53.

The recessed annular area 100 is approximately of the same height as the positive heat sink 53. For tolerance, and therefore manufacturing, reasons, there is a narrow intermediate space 127 between the positive heat sink 53 and the annular area 100. This leads to a restriction of the cooling air sucked in, thus preventing the cooling air flow from being split excessively poorly. This arrangement leads to the cooling air flow which is sucked in through the openings 103 flowing essentially between the connecting plate 56 and the negative heat sink 106 and therefore effectively cooling the negative diodes 58, because there is no preheating by cooling of positive diodes 88.

The distance between the connecting plate 56 and the positive heat sink 53 is less than the distance between the negative heat sink 106 and the connecting plate 56. Furthermore, the external diameter of the connecting plate 56 is approximately the same as or of equal size to a curved outer edge 107 between the attachment eyes 108 for screws 110 for the positive heat sink 53.

The air inlet openings 97 are separated by webs 128, which are arranged obliquely with respect to the axis of the electrical machine.

The negative heat sink 106 and the positive heat sink 53 overlap in the area of the outer circumference of the positive heat sink 53, wherein, in this case, an edge, located radially on the outside, of the opening 97 in the negative heat sink 106 is axially opposite the outer circumference of the positive heat sink 53. Furthermore, the negative heat sink 106 has a radially outer edge 200 with a surface which is essentially parallel to the axis and is adjacent to an outlet opening 203 in the bearing shield 13.2.

Figure 3:
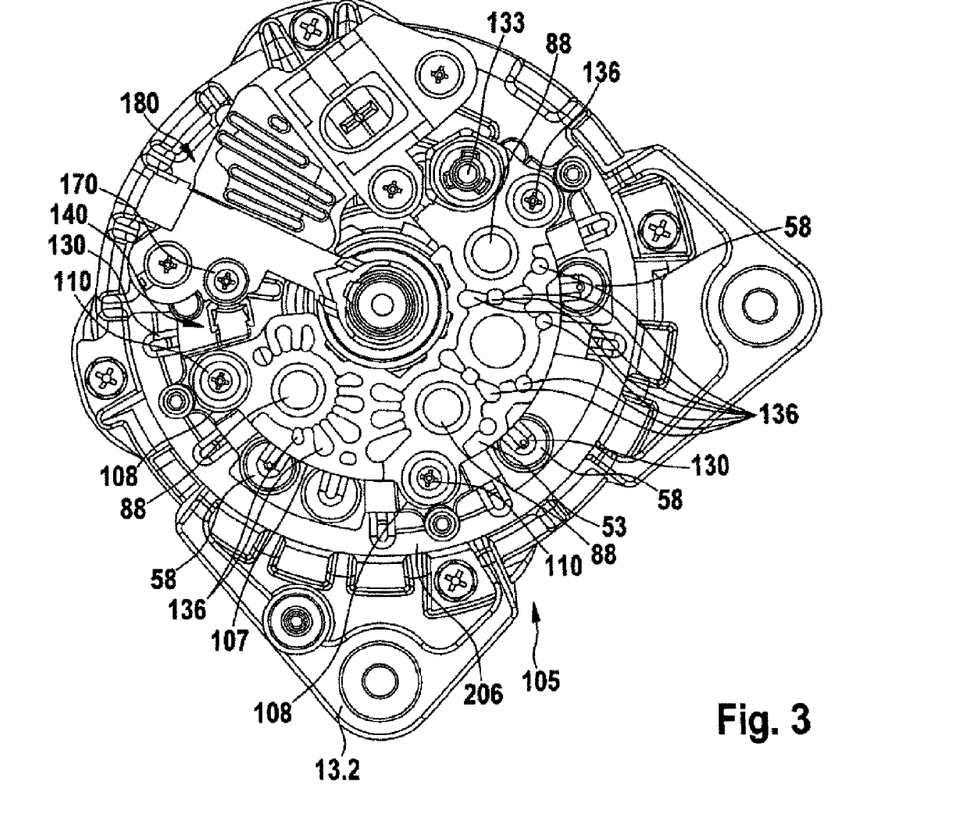
FIG. 3 is a plan view of an end of the electrical machine of FIG. 1.

The invention provides for a positive diode 88, which is closest to the negative diode 58, to be arranged offset in the circumferential direction, see also FIG. 3. Inter alia, this figure shows the positive heat sink, which has holes around a positive diode 88.

FIG. 3 shows a plan view of the positive heat sink 53. The connecting plate 56 is arranged under the positive heat sink 53 although only the connecting loops 130 which project below the positive heat sink 53 from this connecting plate 56 can be seen.

The figure also shows the so-called B+ bolt 133, while the electrical power is emitted to the on-board power supply system. The positive diode 88 which is closest to the B+ bolt 133, approximately at the 2 o'clock position, is surrounded only by three cooling openings 136. Two of these cooling openings 136 are also used for cooling the positive diode 88, which is located at the 5 o'clock position. This positive diode 88 is surrounded by a total of six cooling air openings 136, four of which are used exclusively for cooling this positive diode 88. The third positive diode 88, approximately at the 8 o'clock position, is surrounded by eight cooling air openings 136, which are used directly for cooling this diode.

The cross section through the cooling air openings 136 is determined taking account of the computational uniform splitting of the cross section through the cooling air openings 136 between the positive diode 88, which is located approximately at the 2 o'clock position, and the positive diode 88, which is located at the 5 o'clock position. Determined in this way, the positive diode 88 which is located at the 2 o'clock position is cooled only by two cooling air openings. Furthermore, two cooling openings 136 are also used for cooling the positive diode 88 which is located at the 5 o'clock position, as a result of which this is cooled, on average, by four cooling air openings.

An electrical machine, in particular an electrical generator, having a stator and a rotor is accordingly disclosed, wherein the stator has a stator winding (a plurality of phase windings) which is electrically connected to a rectifier, wherein the rectifier has positive and negative diodes which are connected by means of a bridge circuit, wherein the positive diodes are connected to a positive heat sink and the negative diodes are connected to a negative heat sink (plugged-in or soldered), wherein cooling air openings 136 are provided for the purpose of cooling the positive diodes 88, wherein the positive diode 88 which is located closest to a B+ bolt is cooled to the least extent through cooling air openings 136 and cooling air passing through them, measured with respect to the cooling cross section which can be calculated for the cooling air openings 136.

In this context, for an electrical machine based on the previous approach, the invention provides that a positive diode 88, which is arranged second closest to the B+ bolt, is cooled better than the other positive diode 88 through cooling air openings 136 and the cooling air which passes through them, measured with respect to the cooling cross section which can be calculated for the cooling air openings 136.

In the situation where there is a third positive diode 88, which is arranged furthest away from the B+ bolt, the invention provides for this diode 88 that, compared with the other positive diodes 88, this has the greatest number of cooling air openings 136, measured with respect to the cooling cross section, which can be calculated, for the cooling air openings 136. This is because, in the area of the third positive diode 88 and in comparison with the other positive diodes 88, the connecting plate 56 covers a relatively large area of the cooling air openings, and in any case more than in the case of the other two positive diodes 88.

Figure 4A:
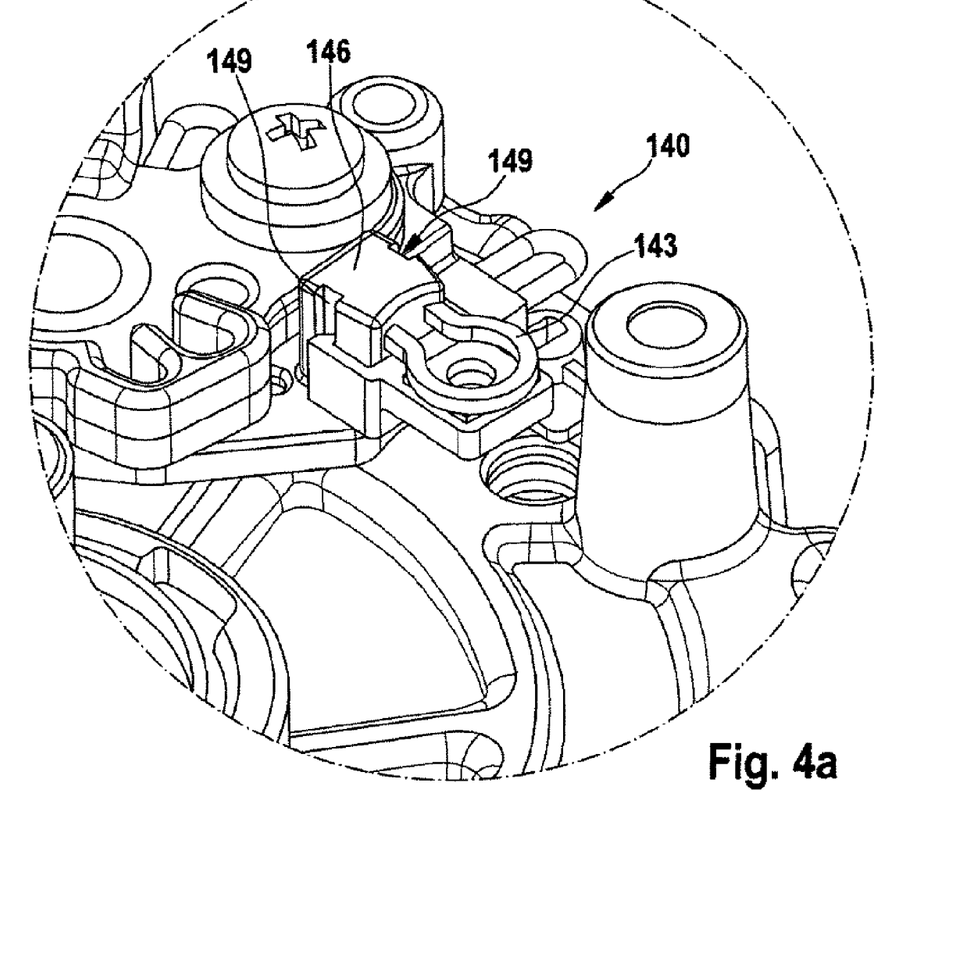
FIG. 4a is a plan view of a connecting plate and a screw contact holder installed on the electric machine of FIG. 1.

FIG. 3 shows a regulator connection 140. This regulator connection 140 consists of a loop 143 which emerges from the connecting plate 56 and is integrally connected to conductors which are embedded in the connecting plate 56, FIG. 4a. The loop 143 emerges at a higher point from an approximately prismatic connecting stub 146, and therefore lies on a different plane to that of the connecting conductors which allow the bridge circuit. The connecting stub 146 extends prismatically in the direction of the axis of the rotor 20 and in each case has a guide or connecting slot 149, see also FIG. 4b, approximately on the side which is directed radially inward and radially outward. A snap-action hook 150 of a screw contact holder 153 engages in each of these mutually parallel guide and connecting slots 149. This screw contact holder 153 has an insert area 159 in addition to a grip area 156 with the snap-action hooks 150, which insert area 159 is a holder, which is square in this case, for a loosely inserted threaded platelet 162. The threaded platelet 162 has an internal thread 165 at its center, which is used to hold a threaded bolt of an attachment and contact screw 170 (FIG. 3). In the installed state (FIG. 4a), the threaded platelet 162 is arranged with its thread 165 centrally below the loop 143, such that an electrical contact is made between a conductor of the regulator 180 and the loop 143 by means of the attachment and contact screw 170 which engages in the thread 165. The threaded platelet 162 is in this case pressed against the loop 143 from underneath, thus pressing the loop 143 against the conductor of the regulator 180.

An electrical machine, in particular an electrical generator, having a stator and a rotor is accordingly disclosed, wherein the stator has a stator winding (a plurality of phase windings) which is electrically connected to a rectifier, wherein the rectifier has positive and negative diodes which are connected by means of a bridge circuit, wherein a connecting plate 56 is fitted with the conductors which are used to represent the bridge circuit, and this connecting plate 56 has a regulator connection 140 which is fitted with a loop 143 which projects out of a connecting stub 146, wherein a guide and connecting slot 149 is arranged on each of the two sides of the connecting stub 146, in each of which a snap-action hook 150 of a screw contact holder 153 engages, which has an insert area 159 which has a holder for a threaded platelet 162, wherein an internal thread 165 is used to hold a threaded bolt of an attachment and contact screw 170 (FIG. 3) and, in the installed state (FIG. 4a), the thread 165 of the threaded platelet 162 is arranged centrally underneath the loop 143, such that an electrical contact is made between a conductor of the regulator 180 and the loop 143 by means of the attachment and contact screw 170 which engages in the thread 165.

Figure 5:
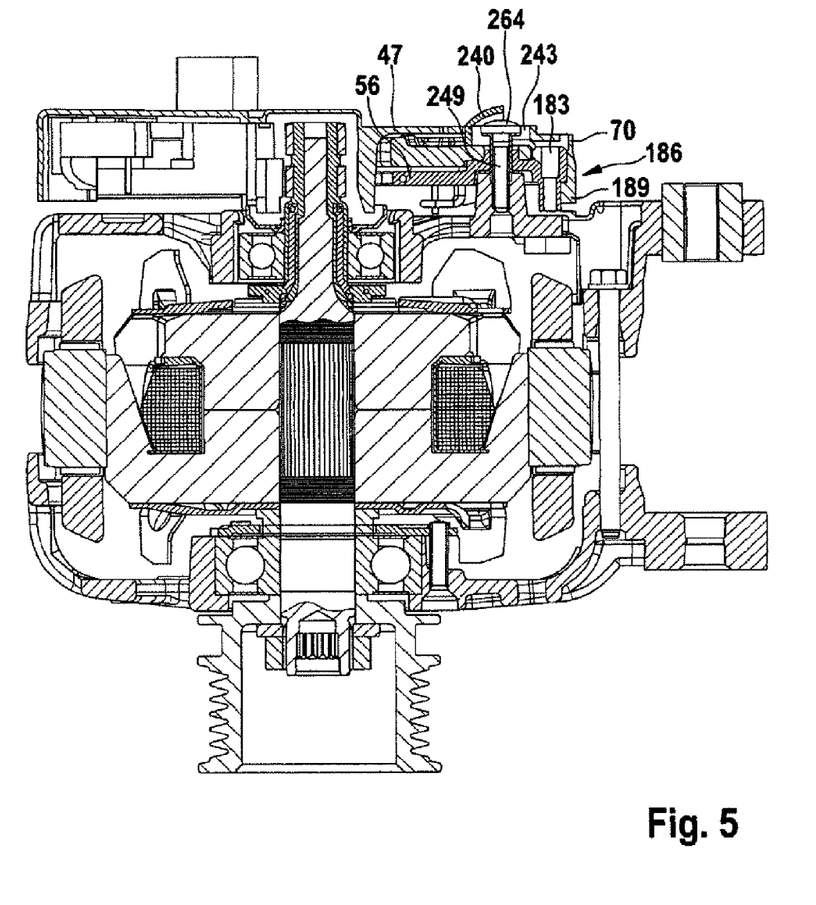
FIG. 5 is a cross-section view through an attachment apparatus of the electric machine of FIG. 1.

FIG. 5 shows a cross section through the attachment apparatus between the connecting plate 56 and the protective cap 47. A holding tube 183 extends radially outward from the connecting plate 56, and the inside of the protective cap 47 rests on the side of this holding tube 183 which faces away from the bearing shield 13.2. On its outside, the holding tube 183 has a step 186, behind which a snap-action hook 189 on the protective cap 47 engages.

An electrical machine, in particular an electrical generator, having a stator and a rotor is accordingly disclosed, wherein the stator has a stator winding (a plurality of phase windings) which is electrically connected to a rectifier, wherein the rectifier has positive and negative diodes which are connected by means of a bridge circuit, wherein a connecting plate 56 is fitted with the conductors which are used to represent the bridge circuit, wherein an attachment apparatus is provided between the connecting plate 56 and the protective cap 47, and a holding tube 183 extends approximately radially outward from the connecting plate 56, with the inside of the protective cap 47 preferably resting on each side which faces away from the bearing shield 13.2, wherein, on its outside, the holding tube 183 has a step 186 behind which a snap-action hook 189 on the protective cap 47 engages.

Figure 6:
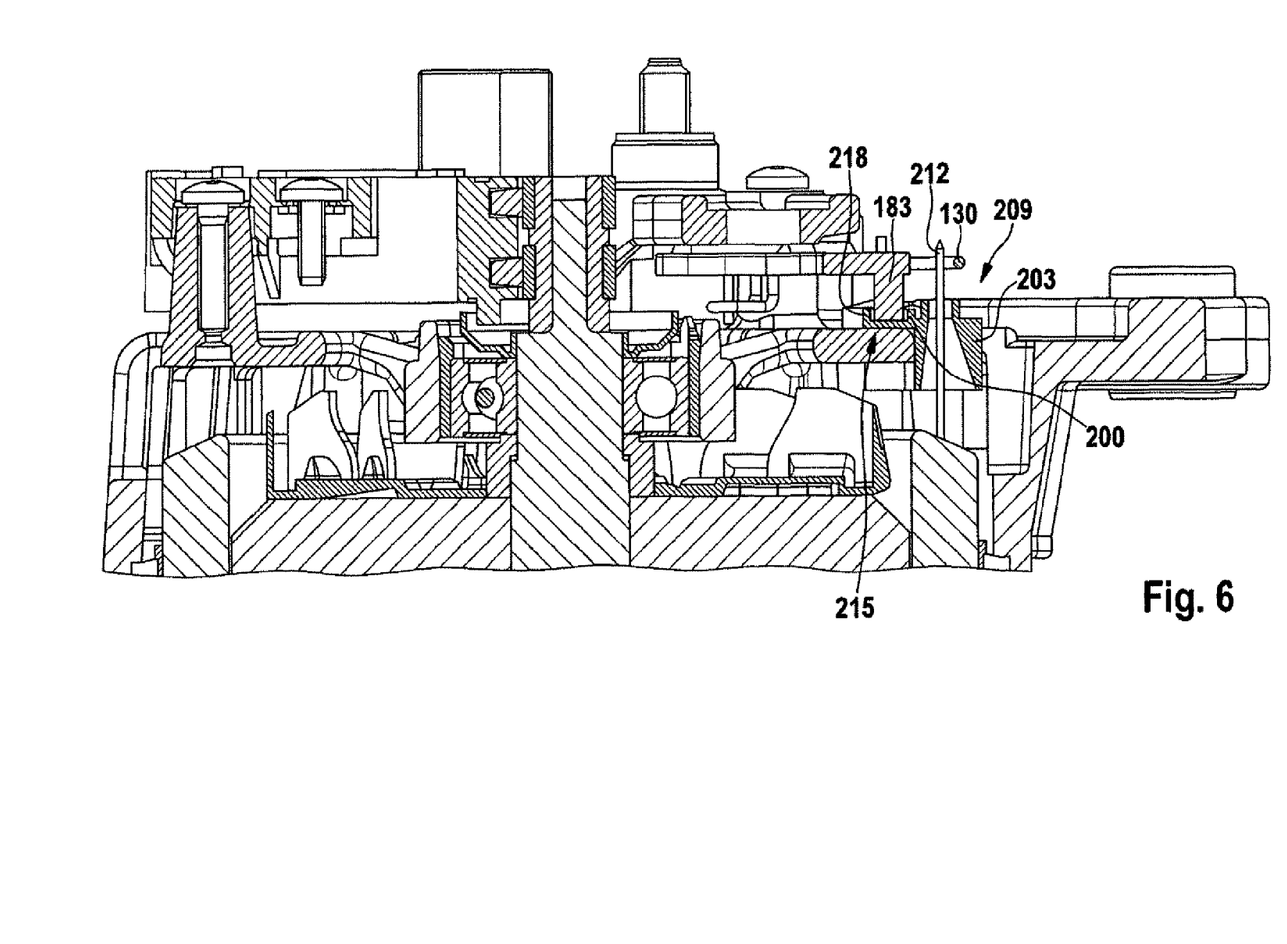
FIG. 6 is a cross-section view showing how the connecting plate of FIGS. 4a and 4b engages a plate by means of a guide sleeve.
Figure 6A:
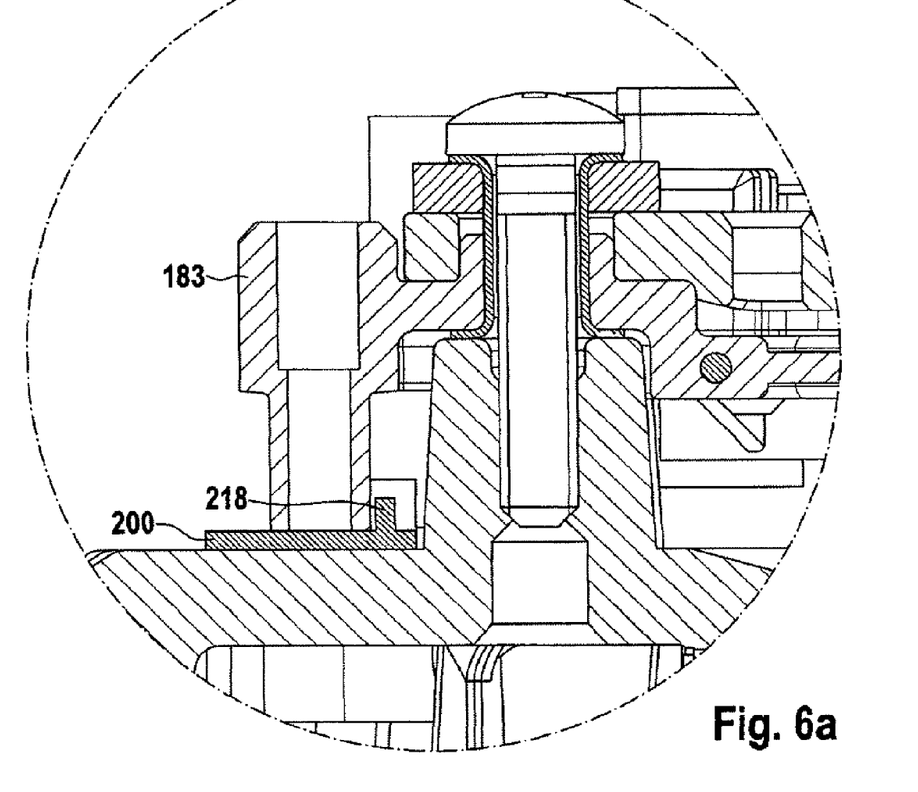
FIG. 6a is a zoomed cross-section view of a portion of FIG. 6.

FIG. 6 shows how the connecting plate 56 and a plate 200 engage in one another by means of at least one guide sleeve 203. The plate 200 has a surface area 206, see also FIG. 6, which rests on a flat surface of the bearing shield 13.2. The at least one guide sleeve 206, which is integrally formed on the plate 200, engages in an opening in the bearing shield 13.2 and holds one or more connecting wires 212 of a stator winding 18. The connecting wires make contact with contact elements in the form of connecting loops 130. A surface element 215 projects radially inward from the plate 200, and a web section 218 of this surface element 215 projects axially outward. This web section 218 is, for example, in the form of a ring or line, as illustrated in FIG. 6, and engages behind the holding tube 183. The holding tube 183 is supported radially outside this web section 218 and therefore, in the state in which it has not yet been fixed (installed), impedes the plate 200 which, in this way, cannot directly leave the assembly comprising the bearing shield 13.2 and the connecting plate 56 loose.

An electrical machine, in particular an electrical generator, having a stator and a rotor is accordingly disclosed, wherein the stator has a stator winding (a plurality of phase windings) which is electrically connected to a rectifier, wherein the rectifier has positive and negative diodes which are connected by means of a bridge circuit, wherein a connecting plate 56 is fitted with the conductors which are used to represent the bridge circuit, wherein the connecting plate 56 and a plate 200 engage in one another by means of at least one guide sleeve 203, wherein the plate 200 has a surface area 206 which rests on a flat surface of the bearing shield 13.2, and the at least one guide sleeve 206 which is integrally formed on the plate 200 engages in an opening in the bearing shield 13.2 and holds one or more connecting wires 212 of a stator winding 18, wherein a surface element 215 projects radially inward from the plate 200, from which surface element 215 a web section 218 projects axially outward and supports the holding tube 183 on the plate 200 radially outside this web section 218.

Figures 4B, 4C:
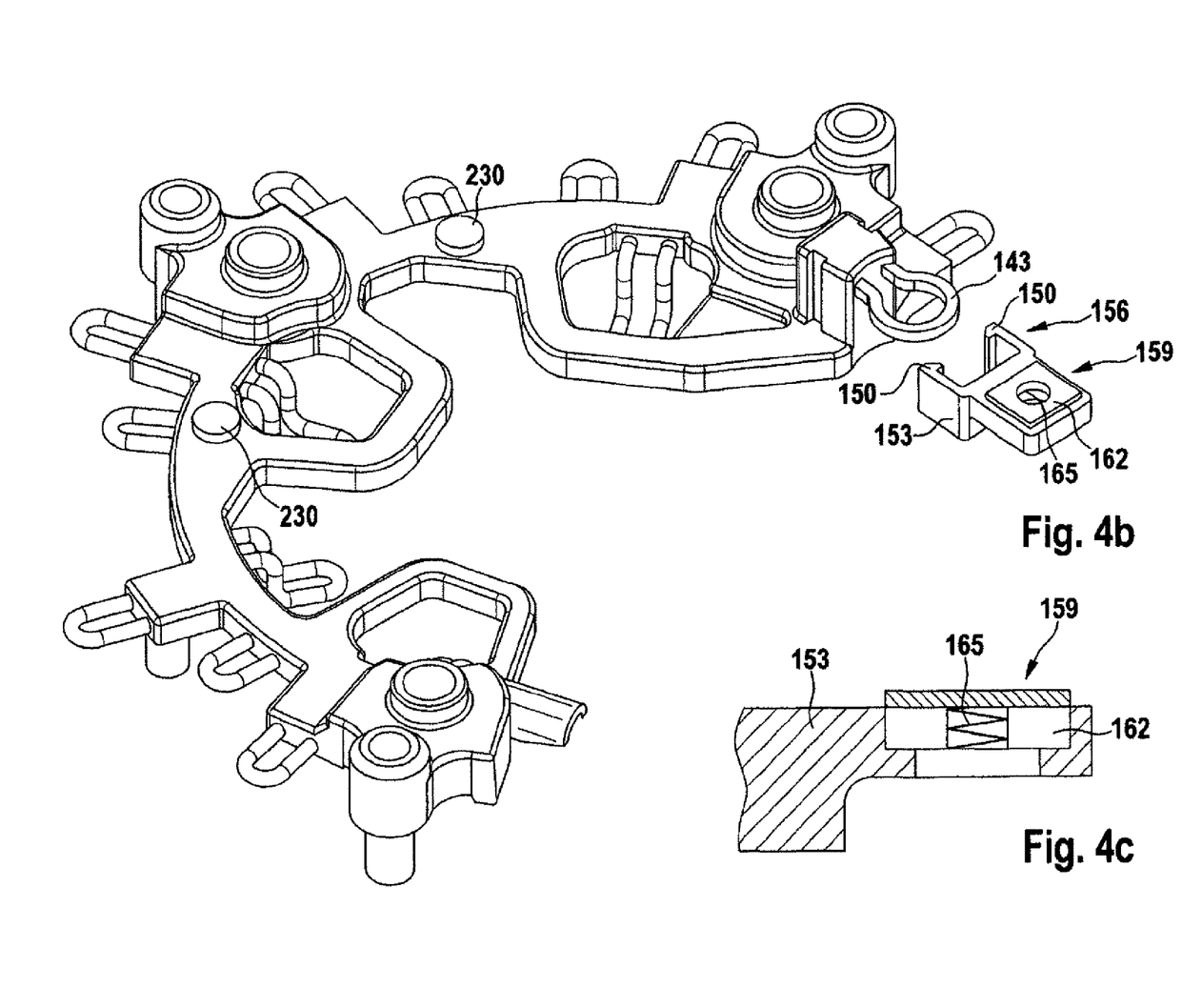

FIG. 4b shows a spacing element 230 on the connecting plate 56, which spacing element 230 is mounted on the positive heat sink 53, on a spacing element which is not shown here but is of the same or similar design.

FIG. 5 shows a sketch of a screw cover 240 which is formed integrally with the protective cap 47, composed of plastic. This screw cover 240 covers only half of the screw head 246, as a result of which the opening 243, which is shown here by way of example as being circular, is closed only in the form of a semicircle by the screw cover 240. This has the advantage that the screw 249 cannot become loose when the electrical machine 10 is mounted in place in a vehicle. Connected cables on the B+ bolt 133 first of all prevent this. The other advantage is that material can be saved at this point.

An electrical machine, in particular an electrical generator, having a stator and a rotor is accordingly disclosed, wherein the stator has a stator winding (plurality of phase windings) which is electrically connected to a rectifier, wherein a protective cap 47 composed of plastic covers the rectifier, wherein a positive heat sink 53 is attached to the bearing shield 13.2 by at least one screw 249, wherein the screw 249 is covered by a screw cover 240, which is formed integrally with the protective cap 47, and wherein this screw cover 240 only partially, preferably half, covers the screw head 246, as a result of which an opening 243 around the screw 249 is only partially closed, preferably in a semicircular shape, by the screw cover 240.

The invention claimed is:

1. An electrical generator, having a stator (16) and a rotor, wherein the stator (16) has a stator winding (18) which is electrically connected to a rectifier (105), wherein the rectifier (105) has positive and negative diodes (88, 58) which are connected by a bridge circuit, wherein the positive diodes (88) are connected to a positive heat sink (53) and the negative diodes (58) are connected to a negative heat sink (106), wherein the rectifier is covered by a protective cap (47) which has cooling air openings, characterized in that the protective cap (47) has at least one opening (103) which is arranged axially above the negative diode (58) and the negative heat sink (106), wherein a connecting plate (56) is arranged between the positive heat sink (53) and the negative heat sink (106), wherein the connecting plate (56) has an opening (91) through which cooling air can flow and the opening (91) is smaller than an extreme distance between two diagonally opposite cooling air openings (136) which are arranged immediately around the positive diode, wherein the distance between the connecting plate (56) and the positive heat sink (53) is less than the distance between the negative heat sink (106) and the connecting plate (56).

2. The electrical generator as claimed in claim 1, characterized in that the opening (103) is extended at least such that, in the axial direction, at least one area section of a diode surface with a length of more than half the diameter of a negative diode (58) is exposed without any interruption, and is covered by the opening (103).

3. The electrical generator as claimed in claim 1, characterized in that a cavity (109) is arranged between the protective cap (47) and the negative heat sink (106), wherein the opening (103) which is arranged axially above the negative diode, a diode connecting wire (94) of the negative diode (94), and a radial inner edge (112) of the negative heat sink (106) are arranged on one plane (113).

4. The electrical generator as claimed in claim 3, characterized in that a positive diode (88) which is closest to the negative diode (58) is arranged offset in the circumferential direction.

5. The electrical generator as claimed in claim 1, characterized in that the positive heat sink (53) is arranged axially above an air inlet opening (97) in the bearing shield (13.2).

6. The electrical generator as claimed in claim 5, characterized in that the positive heat sink (53) has cooling air openings (136) around a positive diode (88).

7. The electrical generator as claimed in claim 1, characterized in that an opening (82) in the protective cap (47) axially opposite the positive diode (88) is at a greater axial distance from the negative heat sink (106) than the opening (103) in the protective cap (47) axially opposite the negative diode (58).

8. The electrical generator as claimed in claim 1, characterized in that the bearing shield (13.2), the negative heat sink (106), and the air inlet openings (97) are separated by webs (128), wherein the webs (128) are arranged obliquely with respect to the axis of the electrical generator, and radially inward with respect to a claw-pole board (23).

9. The electrical generator as claimed in claim 1, characterized in that the negative heat sink (106) and the positive heat sink (53) overlap in the area of the outer circumference of the positive heat sink (53), wherein, in this case, an edge, located radially on the outside, of the opening (97) of the negative heat sink (106) is axially opposite the positive heat sink (53).

10. The electrical generator as claimed in claim 1, characterized in that the protective cap (47) has an outer essentially cylindrical outer edge (70), wherein there is an axial distance (104) between the outer edge (70) and the negative heat sink (106).

11. The electrical generator as claimed in claim 1, characterized in that the negative heat sink (106) is the bearing shield (13.2).

12. The electrical generator as claimed in claim 11, characterized in that the negative heat sink (106) has a radially outer edge (200) with a surface which is essentially parallel to the axis and is adjacent to an outlet opening (203) in the bearing shield (13.2).

13. The electrical generator as claimed in claim 1, wherein the protective cap (47) has a recessed annular area (100) approximately at the height of the positive heat sink (53), wherein there is a space (127) between the positive heat sink (53) and the recessed annular area (100).

* * * * *

UNITED STATES PATENT AND TRADEMARK OFFICE
CERTIFICATE OF CORRECTION

PATENT NO. : 8,531,069 B2  
APPLICATION NO. : 13/001142  
DATED : September 10, 2013  
INVENTOR(S) : Daniel Amaral Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 118 days.

Signed and Sealed this

Fifteenth Day of September, 2015

Michelle K. Lee
*Director of the United States Patent and Trademark Office*